E. RIVETT.
ENDLESS BELT OR CORD AND MACHINE AND PROCESS FOR MAKING THE SAME.
APPLICATION FILED JUNE 22, 1918.

1,389,699.

Patented Sept. 6, 1921.
5 SHEETS—SHEET 1.

Inventor.
Edward Rivett
by Heard Smith & Tennant
Attys.

E. RIVETT.
ENDLESS BELT OR CORD AND MACHINE AND PROCESS FOR MAKING THE SAME.
APPLICATION FILED JUNE 22, 1918.

1,389,699.

Patented Sept. 6, 1921.
5 SHEETS—SHEET 2.

Inventor.
Edward Rivett
by Heard Smith & Tennant.
Attys.

E. RIVETT.
ENDLESS BELT OR CORD AND MACHINE AND PROCESS FOR MAKING THE SAME.
APPLICATION FILED JUNE 22, 1918.

1,389,699.

Patented Sept. 6, 1921.
5 SHEETS—SHEET 4.

Inventor.
Edward Rivett
by Heard Smith & Tennant.
Attys.

E. RIVETT.
ENDLESS BELT OR CORD AND MACHINE AND PROCESS FOR MAKING THE SAME.
APPLICATION FILED JUNE 22, 1918.

1,389,699.

Patented Sept. 6, 1921.
5 SHEETS—SHEET 5.

Inventor.
Edward Rivett
by Heard Smith & Tennant
Attys.

UNITED STATES PATENT OFFICE.

EDWARD RIVETT, OF HULL, MASSACHUSETTS.

ENDLESS BELT OR CORD AND MACHINE AND PROCESS FOR MAKING THE SAME.

1,389,699.  Specification of Letters Patent.  Patented Sept. 6, 1921.

Application filed June 22, 1918. Serial No. 241,318.

*To all whom it may concern:*

Be it known that I, EDWARD RIVETT, a citizen of the United States, residing at Hull, county of Plymouth, State of Massachusetts, have invented an Improvement in Endless Belts or Cords and Machines and Processes for Making the Same, of which the following description, in connection with the accompanying drawing, is a specification, like characters on the drawing representing like parts.

This invention relates to the manufacture of endless belts or cords by the intertwisting of a plurality of filaments whereby the endless belt or cord may be manufactured of any desired length, of any desired diameter, and of any suitable filamentous material.

The object of the invention is to provide a simple and efficient apparatus or machine for intertwisting the plurality of filaments into the endless belt or cord.

A further object of the invention is to provide for the lubrication or treatment of the several filaments of the entire belt or cord or both as required.

A further object of the invention is to provide means for varying as required the lead or phase of the intertwist of the filaments.

A further object of the invention is to furnish a novel process for making an endless belt or cord by the intertwisting of a plurality of filaments.

A further object of the invention is to provide a novel article of manufacture consisting of an endless belt or cord composed of a plurality of intertwisted filaments.

These and other objects and features of the invention will appear more fully from the following description and drawings and will be particularly pointed out in the claims.

The drawings illustrate a preferred form of machine for making the endless belt or cord together with the belt or cord itself in different steps of its formation.

In the drawings—

Figure 1:
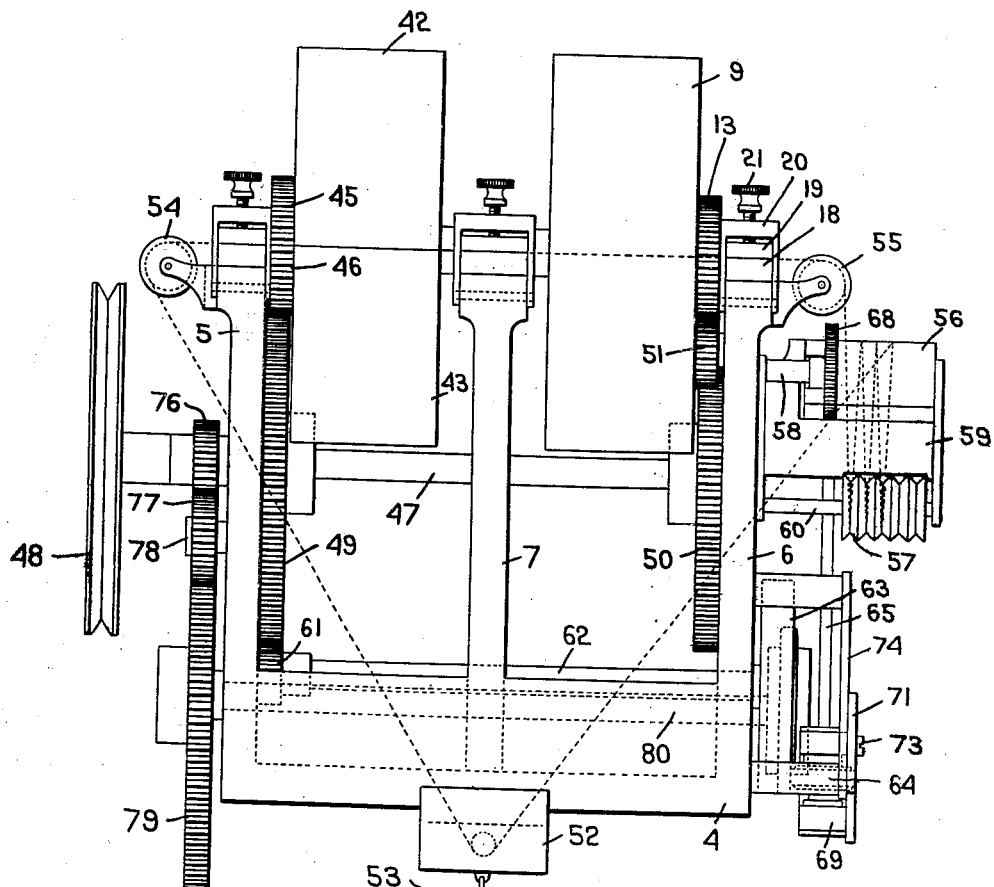
Figure 1 is a front elevation of a preferred form of machine embodying the invention, the path of the belt or cord being formed being indicated in dotted lines.
Figure 2:
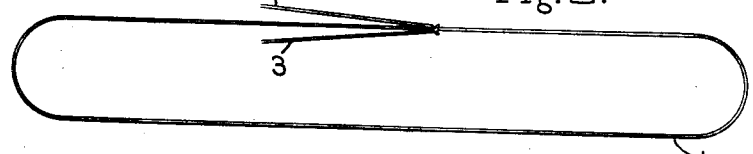
Fig. 2 is a view of the article made by the machine as it is at the beginning of the operation.
Figure 3:
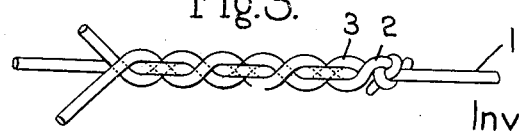
Fig. 3 is a view of a portion of the article after the operation has progressed to a slight extent.

The machine, a simple and preferred form of which is shown in the drawings is designed to form an endless belt or cord, steps in the construction of which are shown in Figs. 2 and 3. This endless belt or cord comprises an endless core filament 1 which is formed by splicing, tying, or in any other suitable way uniting, the ends of a filament of the required length based upon the length of the endless cord or belt to be made. This filament may be formed of any suitable material. This core filament is preferably intended to act merely as a core or former in the starting of the operation of manufacturing the belt or cord and hence while it will remain in the structure of the finished belt or cord will usually not perform any function in the completed article and is preferably not intended to stand any strain and may be broken when the completed article is put into use.

The endless belt or cord comprises in addition a pair of filaments 2 and 3 which are secured in any suitable way, as by tying, to the core filament 1. These filaments constitute the permanent structure of the belt or cord and may be of any suitable material depending upon the size, strength and uses of the finished articles. Each filament 2 and 3 may itself be composed of one or more filaments if desired. In the operation of forming the belt or cord these filaments are intertwisted with each other about the core filament and this is preferably done by progressively twisting said filaments 2 and 3 in reverse directions about the core filament 1 as shown in Fig. 3. The operation is continued in this manner and when the starting point is reached further continuation of the operation causes the filaments 2 and 3 to be twisted in reverse directions about the structure formed by the core filament and the intertwisted filaments 2 and 3 themselves. Thus the operation proceeds over and over again around and around the length of the core filament until a belt or cord of the required diameter and strength is built up. At the conclusion of the operation the free ends of the filaments 2 and 3 are tucked or threaded into the intertwisted portion or otherwise embedded into the twisted structure so that they will be retained in position.

During the progress of the operation of building up the structure it is desirable that the lead or phase of the twists of the filaments 2 and 3 shall be varied so that as one twisted layer is built up on a succeeding one the filaments shall fit into the spaces of the underlying twisted structure and thus form a firm structure in which the concentric layers are closely locked together. The variation of the lead or phase of the twist will depend upon the character and size of the filaments employed and may be adjusted according to the particular conditions.

It is also frequently desirable in manufacturing this article that it should be impregnated or treated with some substance such, for example, as is usually employed in treating belts. Such a treatment is provided for in this invention and may be applied during the progress of the operation either directly to the filaments 2 and 3 before they are intertwisted or to the intertwisted structure as a whole or both as found desirable. For this purpose the filaments 2 and 3 may before being intertwisted pass through a container of the impregnating substance, or the endless belt or cord as it is being formed may itself pass through a container filled with the treating substance, or both methods may be simultaneously employed.

It will thus be seen that an endless belt or cord is produced by this invention which may be made of any desired length of any desired diameter or thickness, which may be treated or impregnated as required, and which may be built up from filaments of various materials to give a uniform structure throughout. The article is particularly useful for endless belts for driving machinery of all kinds especially at very high speeds. It is cheaply, readily and accurately manufactured.

A simple and efficient form of machine for making this article is disclosed in the drawings and forms an important part of the invention. This machine comprises essentially a frame upon which is mounted a pair of reversibly rotatable filament carriers provided with hollow axles journaled in the frame, and means for progressively feeding the endless core filament through the axles so that the filaments extending from the carriers and previously secured to the endless core filament will be twisted in reverse directions about the core filament and then about themselves as the structure is progressively fed until the endless belt or cord of the required size is formed.

The frame of the machine is shown as a somewhat box-like structure having the base 4 and the upwardly projecting sides 5 and 6 and an intermediate vertical web 7. This frame may be mounted upon any suitable support or table.

The two rotary carriers are of generally similar construction and are shown as cup shaped with the open sides facing each other. The carrier at the right hand of the machine is shown in detail and a description of this carrier will suffice for a description of both. But it will be understood that the rotary carriers may be of various shapes and constructions so long as they are of the character to perform the function of carrying the filament supply, allowing the core filament to be fed axially therethrough, twisting the filament about the core filament in reverse directions, and enabling the core filament to be put in position and the completed belt or cord to be removed.

The right hand carrier is of general cylindrical shape closed at one side and open at the other. One sector of the carrier extending to the axis must be and is removable to enable the core filament to be put in place and the complete belt to be removed when finished. In the form shown this is secured by making the carrier in two equal sectors 8 and 9 by dividing the carrier diametrically through the axis. The carrier is mounted upon a hollow axle and as the removable sector must extend to the center of this hollow axle the axle itself is formed in two sectors 10 and 11 corresponding to the sectors 8 and 9 respectively of the carrier proper. The carrier is shown as rotated by a pinion secured thereto and therefore this pinion must likewise be split or formed in two sectors 12 and 13 respectively. The carrier parts, axle parts and pinion parts may be secured together in any suitable manner. As shown the hub of the pinion extends inwardly between the axle and the carrier. The axle part is fastened as by screws 14 to the pinion and the pinion in turn is fastened as by screws 15 to the carrier part.

When the parts of the carrier, axle and pinion are assembled the ends of the axle which are reduced at 16 and 17 are mounted in split bearings at the upper ends of the web 7 and side 6. These bearings are split to enable the carrier sectors to be removed. Any suitable split bearing may be provided for this purpose. As shown the three bearings are of similar construction. A bearing block 18 is secured to the top of the standard and a second bearing block 19 is pivoted thereto, the ends of the axle being received in journals between these blocks. A clamp 20 straddles and is pivoted to the upright and is provided with a set screw 21. When this clamp is swung into vertical position and the set screw is turned down it locks the parts of the split bearing together. When the set screw is loosened up and the clamp swung forward horizontally the upper portion 19 of the split bearing may be swung back on its pivot allowing the movable sector of the carrier, axle and pinion to be taken out and replaced.

The filament supply is carried by one sector of the carrier, and as shown, by the sector 9. This filament supply is herein shown as a spool 22 of thread 23 journaled upon a stud 24 projecting horizontally from the wall of the carrier. Suitable tension devices are provided for the filament supply. One simple form of such tension device is shown as a flat metal spring 25 secured at one end 26 to the carrier wall and at its free end 27 engaging the body of filament on the spool 22. The required pressure of the spring upon the filament supply is given by a lever 28 fulcrumed at 29 on the carrier engaged at 30 beneath the spring 25 and adjusted by means of the set screw 31.

When it is desired to impregnate or treat the filament before it enters the structure of the endless belt or cord a suitable impregnating substance may be mounted in the carrier itself and a container for such substance is indicated at 32. The filament 23 upon leaving the filament spool 22 runs through the container 32 and is thus impregnated or treated. The filament on the carrier must be led from the supply to a guide eye at the point where it is to be twisted about the core filament or the structure as it is built up. This is preferably done by leading the filament from the interior of the carrier to the interior of the hollow axle, through an opening 33, then leading it along the hollow axle to the inner end thereof and to a suitable guide eye at the inner end. Preferably this guide eye is formed in the end of a spring member 34 secured at 35 to the axle and provided at its free end with the guide eye 36 through which the filament is outwardly threaded and with the final guide eye 37 through which it is inwardly threaded. The axle part is cut away or relieved beneath the spring 34 and the spring 34 at its free end is preferably provided with a curved face 38. This spring guide eye is provided so that the filament as it is being twisted may be kept in close contact with the structure of the belt or cord as it is being built up, the spring yielding as the belt or cord increases in diameter. As the carriers face each other, the guide eyes through which the filaments pass to the core are closely adjacent and consequently intertwisting of the filaments takes place.

Figure 7:
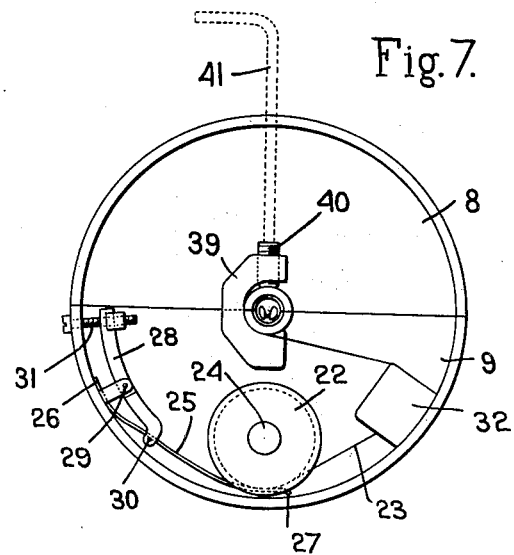
Fig. 7 is a side elevation of one of the rotary carriers of the machine with a locking tool shown in dotted lines.
Figure 8:
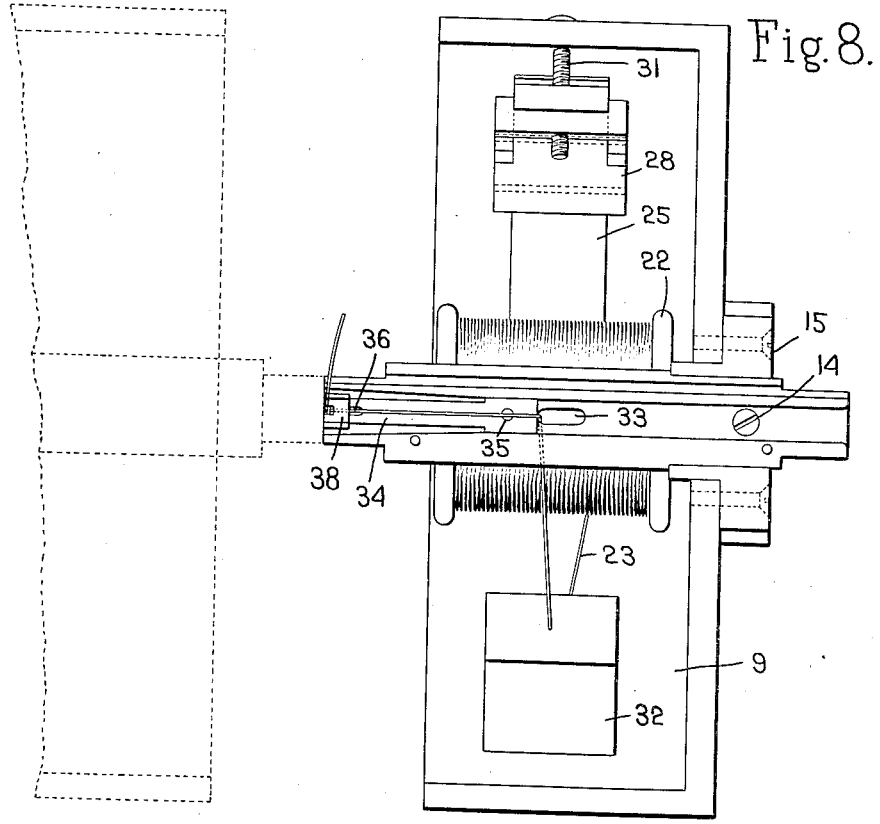
Fig. 8 is an enlarged view in plan of one section of one of the rotary carriers with a portion of a section of the opposite carrier indicated in dotted lines.
Figure 9:
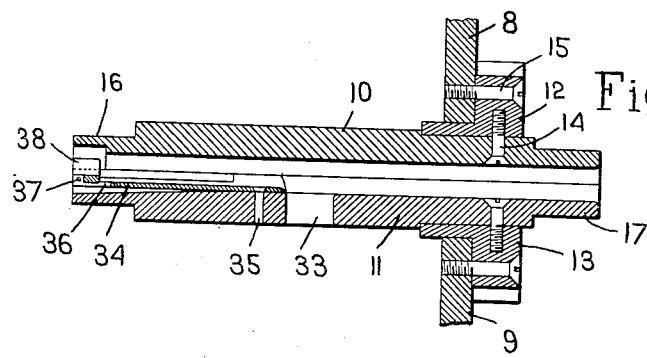
Fig. 9 is a view in cross section transverse to the plane of Fig. 8 showing the axle and immediately adjacent parts of one of the rotary carriers.

Suitable means are provided for fastening or locking the two sectors or parts of the rotary carrier and axle together. Such a means may comprise a stout clamp 39 adapted partially to encircle the central portion of the axle and which may be permanently secured to one of the axle sectors. A set screw 40 extends through the opposing arm of the clamp and bears against the other axle portion. Hence when this set screw is screwed down the two axle sectors are clamped rigidly together and thus two sectors of the entire carrier are firmly held in position. This set screw may conveniently be operated by a tool 41 insertible through a hole in the periphery of the carrier as indicated in dotted lines in Fig. 7.

The two rotary carriers are as already stated preferably of similar construction. When in position the hollow axles are preferably in alinement, and in the form of machine illustrated the axles are journaled in the split bearings at the top of the standards 5, 6 and 7. The carrier 8, 9 at the right is provided with the pinion 12, 13 by which it is rotated and the carrier 42, 43 at the left is provided with a split pinion 45, 46 by which it is rotated. As already explained the carriers are rotated reversely or in opposite directions and in order that the belt or cord may be evenly formed these carriers obviously desirably rotate at the same speed. This reverse rotation of the carriers at the same speed is secured by gearing from a main or power shaft 47 carrying a pulley 48 driven from any suitable source of power. The shaft 47 carries a large gear 49 meshing directly with the pinion 45, 46, thus driving the carrier 42, 43 in a direction of rotation opposite to that of the main shaft. The shaft 47 carries a second gear 50 meshing with a pinion 51 which in turn meshes with the pinion 12, 13 on the carrier 8, 9 and thus the carrier is driven in a direction of rotation the same as that of the main shaft. These various gears and pinions are so related that the speed of rotation of the two carriers is the same.

In starting the formation of an endless belt or cord the clamps 39 are loosened, the split bearings for the axles of the carriers are opened, and the removable sectors of the two carriers taken off. The filament core 1 is then laid in in the hollow axles of the other sectors. The filament in each carrier is run through the openings 33 into the eye 36 and out of the eye 37 and tied or secured at its end to the filament core 1 as shown in Fig. 2. The removable sectors of the carriers are then returned to their position and the parts of the carriers clamped together. One carrier is then set at an angle of 180° to that of the other and then the split bearings are clamped in place and the machine is ready for operation.

If the entire body of the belt or cord as it is formed is to be impregnated or lubricated as a whole it is run through a suitable impregnating or lubricating means. This for example may be a container 52 containing the impregnating substance and may be suspended upon the belt or cord. In order to secure a proper tension on the belt or cord and assist in the feeding thereof suitable means are provided such for example as by applying a sufficient amount of weight 53 hooked upon the bottom of the container 52 and this tension is increased or varied as conditions require. If the container be not used the weight may be hung directly upon, or the required tension otherwise applied directly to, the belt or cord itself.

While the belt or cord as it is formed may be fed by hand axially through the reversely rotating carriers it is of course desirable that this feeding operation shall be performed automatically by the machine and a preferred form of such feeding means is shown as embodied in the machine. As already explained it is also desirable that the feeding movement shall be varied to change the lead or phase of the twist in the belt or cord and for this purpose the feeding mechanism is shown as arranged with means for automatically increasing this lead at such times and to such an extent as necessary. For that purpose a pattern controlled mechanism is shown as one means for securing this result.

In the preferred construction of feeding mechanism illustrated the core filament after passing through the axles of the rotary carrier extends over idler pulleys 54, 55 mounted one at each side of the machine and supported from the standards 5, 6 respectively. From the idler 55 the core filament passes down about the horizontally arranged friction surfaced feed roll 56 and horizontally arranged idlers 57, being given a number of turns about the feed roll 56 and the separate idlers 57 to secure the necessary frictional engagement. The feed roll 56 has its shaft 58 journaled in a bracket 59 secured to or projecting laterally from the standard 6 and in this bracket the shaft 60 for the separately revoluble idlers 57 is also secured.

The feed roll 56 in the construction illustrated is driven from the main shaft 47 as follows. The gear 49 on the main shaft 47 intermeshes with and drives a pinion 61 secured to and driving a shaft 62 which extends across to the other side frame and carries at its end a friction disk 63. The friction roll 64 engages the face of the friction disk and revolves with a two-part shaft 65, 66 carrying at its upper end a worm 67 engaging a worm wheel 68 on the shaft 58 of the friction feed roll 56. Thus with the friction roll 64 in engagement with the face of the friction disk 63 the friction feed roll 56 is driven from the main shaft and the core filament and the endless belt or cord as it is formed is fed progressively and continuously through the axis of the reversely rotating carriers.

According as the friction roll 64 is positioned nearer to or farther from the axis of rotation of the friction disk 63 the feed will be varied and a simple and preferred means for varying this means by pattern controlled mechanism is disclosed.

The friction roll 64 is shown as splined to the part 65 of the two-part shaft and as carried in the bracket 69 sliding on the shaft part 65. This bracket is pivotally secured at 70 to a lever 71 having a slot 72 fulcrumed on a stud 73 carried by a bracket 74 secured to and projecting laterally from the standard 5. If now the free end of the bracket be raised or lowered the friction roll will be slid up or down on the shaft part 65 and the extent of speed varied. As this swinging movement of the lever will also swing the lower end of the shaft part 65 slightly backward or forward a universal joint 75 is inserted between the shaft part 65 and 66.

In order to move the lever 71 and thus vary the feed the following mechanism is provided as a preferred means driven from the main shaft on the machine. A pinion 76 on the main shaft 47 engages a second pinion 77 mounted on a stud 78 projecting from the upright 5 and this pinion 77 in turn engages a gear 79 secured to and driving a shaft 80 extending across to the opposite side of the frame. At the opposite end the shaft 80 carries a pattern strip driver such as a sprocket wheel 81 upon which rides an endless pattern strip such as a sprocket chain 82 provided with adjustably spaced strikers 83. A bracket 84 projecting laterally from the standard 6 above and below the sprocket wheel has journaled therein a screw threaded shaft 85 which extends vertically past the face of the sprocket wheel. Near its upper end this screw threaded shaft has secured thereto a star wheel 86 the arms 87 of which project into the path of the strikers 83 on the sprocket chain. The lever 71 is provided at its end with a socket 88 pivoted thereto at 89 and embracing the screw threaded shaft 85. This socket is somewhat larger than the diameter of the screw threaded shaft 85 and is threaded internally. The lever 71 is of spring metal and under the spring action thus afforded holds one side of the internally screw threaded socket into engagement with the screw threaded shaft 85. Hence by pressing the lever laterally the screw threaded socket may be shifted up and down on the shaft to any position desired and then when released springs into engagement with the screw threaded shaft. This adjustment of the position of the lever can also further be effected by turning the screw threaded shaft by means of its milled upper end 90 provided for that purpose.

Figure 4:
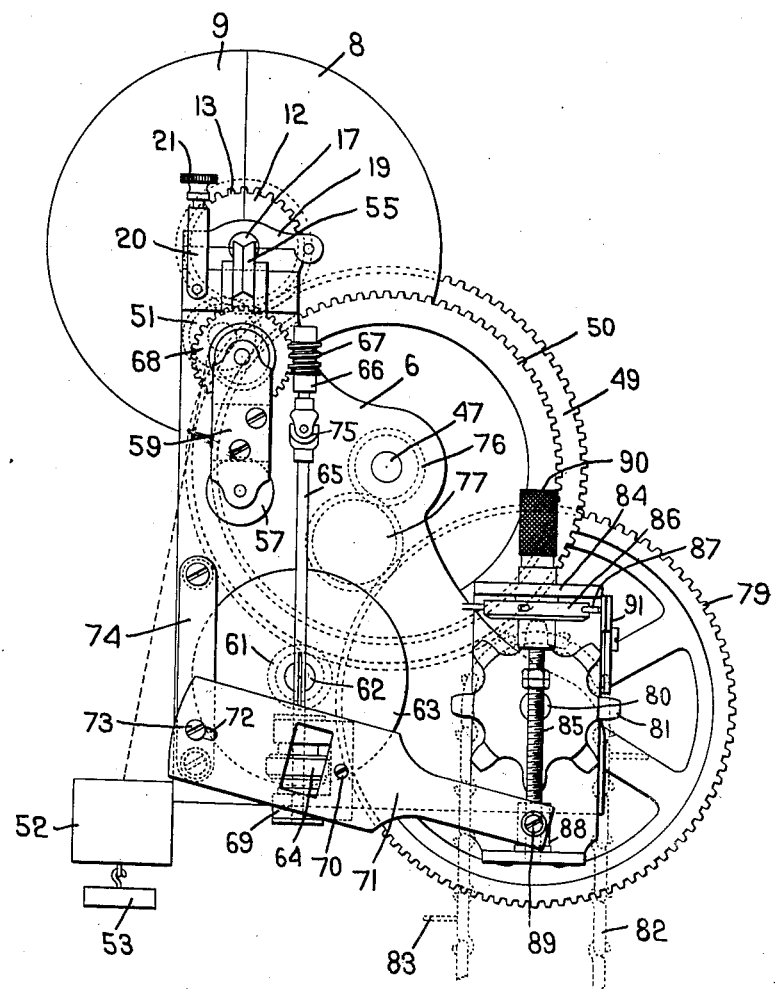
Fig. 4 is a side elevation of the machine shown in Fig. 1 and looking toward the right of Fig. 1.
Figure 5:
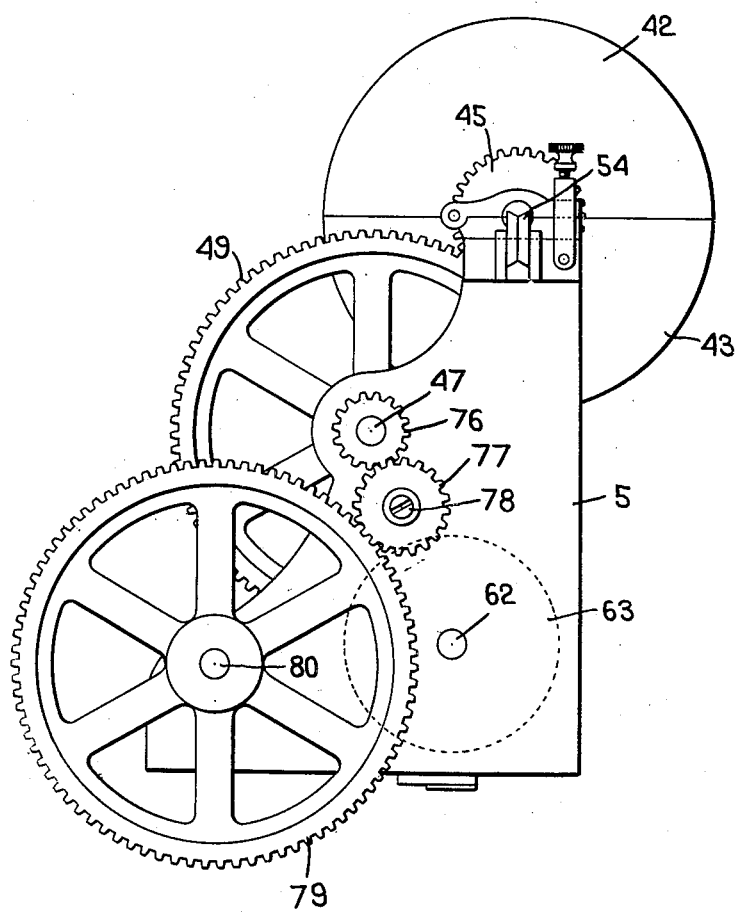
Fig. 5 is a side elevation of the machine shown in Fig. 1 and looking toward the left of Fig. 1 with the driving pulley removed.
Figure 6:
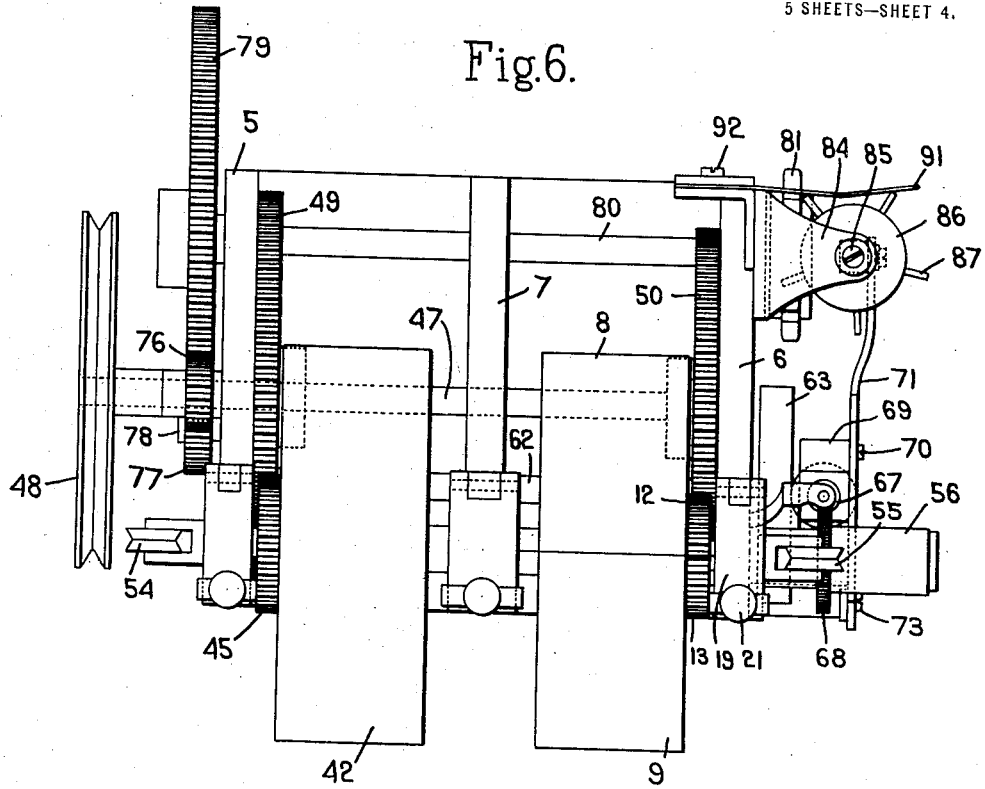
Fig. 6 is a top plan view of the machine shown in Fig. 1.

The operation of the means for varying the feed will now be apparent. Assuming that it is desired to increase the lead of the feed the parts may be set as shown in Fig. 4 with the socket piece 88 near the bottom of the screw threaded shaft 85. As the machine is operated the sprocket wheel 81 is rotated and the sprocket chain feeds thereover until one of its strikers 83 strikes one of the arms 87 on the star wheel 86 thus turning the screw threaded shaft to a predetermined extent and raising the end of the lever 71 correspondingly, and thus moving the friction roll 64 in the direction of the center of the friction disk 63 thus decreasing the speed of the feed. Thus by providing a chain of suitable length and by varying the position of the strikers 83 and by setting the lever 71 any desired speed or change in speed of the feed may be secured. A spring 91 secured at 92 to the rear of the frame projects laterally past the star wheel 86 and serves to prevent overrunning of the star wheel when struck by the strikers on the sprocket chain.

When the operation has been completed, that is, when the belt or cord has reached the size or diameter desired the machine is stopped, the split bearings opened, the removable sectors of the carriers taken off and then the completed belt or cord lifted out and unwound from the friction feed roll 56 and idlers 57. The loose ends of the filaments 2 and 3 are then embedded or tucked into the twisted filaments of the belt or cord and the article is complete.

Having fully described my invention, what I claim as new and desire to secure by Letters Patent is:

1. A machine for making an endless belt or cord comprising a pair of reversibly rotatable carriers provided with hollow axles, means for simultaneously and reversely rotating said carriers, means for progressively feeding an endless core filament through said axles, a filament supply mounted in each carrier, means for guiding the filaments from both carriers into the hollow axles at adjacent points whereby when each filament is led from its supply and secured to the endless core filament, the carrier filaments will be twisted in reverse directions about the core filament and then about themselves until an endless belt or cord of required size is formed.

2. A machine for making an endless belt or cord comprising a pair of reversely rotatable carriers provided with hollow axles, means for simultaneously and reversely rotating said carriers, means for progressively feeding an endless core filament through said axle, a filament supply mounted in each carrier, a guide eye in each axle at the end thereof adjacent the end of the other axle, whereby when each filament is led from its supply through its guide eye and secured to the endless core filament, the carrier filaments will be twisted in reverse directions about the core filament and then about themselves until an endless belt or cord of required size is formed.

3. A machine for making an endless belt or cord comprising a pair of reversely rotatable carriers provided with axially alined hollow axles, means for simultaneously and reversely rotating said carriers, means for progressively feeding an endless core filament through said alined axles, a filament supply mounted in each carrier, an aperture connecting the interior of each carrier with the interior of its axle, a guide eye in each axle at the end thereof adjacent the end of the other axle, whereby when each filament is led from its supply transversely into the axle of its carrier through said aperture thence through its guide eye and secured to the endless core filament, the carrier filaments will be twisted in reverse directions about the core filament and then about themselves until an endless belt or cord of required size is formed.

4. A machine for making an endless belt or cord comprising the construction defined in claim 2 comprising in addition a spring member supporting the guide eye and holding it yieldingly toward the belt or cord as it is formed.

5. A machine for making an endless belt or cord comprising the construction defined in claim 3 comprising in addition a spring member supporting the guide eye and holding it yieldingly toward the belt or cord as it is formed.

6. A machine for making an endless belt or cord comprising a frame, a pair of rotatable carriers provided with hollow axles journaled in said frame in axial alinement, each carrier and its axle having a removable sector extending to its axis, and split bearings in said frame for said axles, whereby an endless belt or cord extending through said hollow axles may be inserted or removed intact thereinto or therefrom.

7. A machine for making an endless belt or cord comprising the construction defined in claim 6 in which each carrier is provided with a split pinion on its axle for driving the carrier.

8. A machine for making an endless belt or cord comprising the construction defined in claim 6 together with means for clamping each carrier and its axle sectors rigidly together.

9. A machine for making an endless belt or cord comprising the construction defined in claim 7 together with means for clamping each carrier, its axle and pinion sectors rigidly together.

10. A machine for making an endless belt or cord comprising a plurality of rotatable carriers each provided with a filament supply, means for rotating said carriers reversely to intertwist the filaments leading therefrom, means for progressively feeding the endless belt or cord formed from said intertwisted filaments through the axes of said rotatable carriers, each carrier having a sector extending to its axis removable to enable the endless belt or cord to be inserted into and removed therefrom.

11. A machine for making an endless belt or cord comprising the construction defined in claim 10 together with means for clamping the sectors of each carrier rigidly together.

12. A machine for making an endless belt or cord comprising a plurality of rotatable carriers each provided with a filament supply, means for rotating said carriers reversely to intertwist the filaments leading therefrom, means for progressively feeding the endless belt or cord as it is being formed through the axes of said carriers, and means for automatically varying the rate of said feed.

13. A machine for making an endless belt or cord comprising a plurality of rotatable carriers each provided with a filament supply, means for rotating said carriers reversely to intertwist the filaments leading therefrom, means for progressively feeding the endless belt or cord as it is being formed through the axes of said carriers, and means for automatically decreasing the rate of said feed.

14. A machine for making an endless belt or cord comprising a plurality of rotatable carriers each provided with a filament supply, means for rotating said carriers reversely to intertwist the filaments leading therefrom, means for progressively feeding the endless belt or cord as it is being formed through the axes of said carriers, and pattern controlled means for automatically varying the rate of said feed.

15. A machine for making an endless belt or cord comprising a plurality of rotatable carriers each provided with a filament supply, means for rotating said carriers, reversely to intertwist the filaments leading therefrom, means for progressively feeding the endless belt or cord formed from said intertwisted filaments through the axes of said rotatable carriers, and impregnating means located in a carrier through which its filament passes and is thereby impregnated.

16. A machine for making an endless belt or cord comprising a plurality of rotatable carriers each provided with a filament supply, means for rotating said carriers reversely to intertwist the filaments leading therefrom, means for progressively feeding the endless belt or cord formed from said intertwisted filaments through the axes of said rotatable carriers, and means for impregnating the belt or cord formed from the intertwisted filaments as it is being formed.

17. A machine for making an endless belt or cord comprising a plurality of rotatable carriers each provided with a filament supply, means for rotating said carriers reversely to intertwist the filaments leading therefrom, means for progressively feeding the endless belt or cord formed from said intertwisted filaments through the axes of said rotatable carriers, and impregnating means suspended upon the endless belt or cord and through which it passes and by which it is impregnated during its formation.

18. An endless belt or cord formed of an endless core filament and a pair of filaments secured at their starting ends to said core filament and twisted in reverse directions progressively about said core filament and about the structure thus formed until the required size of belt or cord is formed with the finishing ends of said pair of filaments embedded in said structure.

19. The process of forming an endless belt or cord which consists in securing the starting ends of a pair of filaments to an endless core filament of the required length, progressively twisting said filaments in reverse directions about said core filament and then about the structure thus formed until the required size of belt or cord is formed and embedding the finishing ends of said filaments into the said twisted structure.

20. The process of forming an endless belt or cord as described in claim 19 which consists further in impregnating one or both of the filaments prior to twisting them together.

21. The process of forming an endless belt or cord as described in claim 19 which consists in addition to impregnating the entire belt or cord while it is being formed.

22. The process of forming an endless belt or cord described in claim 19 which consists in impregnating one or both of the filaments prior to their being twisted together and also in impregnating the entire belt or cord during its formation.

23. A machine for making an endless belt or cord comprising a frame, a pair of rotatable carriers provided with hollow axles journaled in said frame in axial alinement, each carrier and its axle having a movable sector extending to its axis, split bearings in said frame for said axles, a friction surfaced feed roll mounted at one end upon and projecting from said frame, and means for rotating said feed roll, whereby an endless belt or cord may be inserted in or removed from said hollow axles and wrapped about and unwrapped from said feed roll.

24. A machine for making an endless belt or cord having the construction defined in claim 23 together with a shaft projecting from said frame parallel with said feed roll and a plurality of idlers mounted on said shaft to support the turns of the belt or cord about the feed roll.

25. A machine for making an endless belt or cord having the construction defined in claim 14 in which the pattern controlled means includes a pattern strip of the required length provided with suitably positioned strikers.

In testimony whereof, I have signed my name to this specification.

EDWARD RIVETT.